United States Patent [19]

Hayward

[11] Patent Number: 5,027,665

[45] Date of Patent: Jul. 2, 1991

[54] PROTECTIVE GAITERS FOR JOINTS

[76] Inventor: Philip F. Hayward, 47 Firbank, Euxton, Chorley, England

[21] Appl. No.: 464,359

[22] Filed: Jan. 11, 1990

Related U.S. Application Data

[63] Continuation of Ser. No. 210,654, Jun. 23, 1988, abandoned, which is a continuation of Ser. No. 714,254, Mar. 21, 1985, abandoned.

[51] Int. Cl.$^5$ .............................................. F16J 15/54
[52] U.S. Cl. ..................................... 74/18.1; 138/109; 138/121; 277/212 FB; 464/175
[58] Field of Search ......................... 74/18, 18.1, 18.2; 138/177, 178, 121, 120, 109, 96 T; 277/212 R, 212 C, 212 F, 212 FB; 285/4, 177; 464/173, 175

[56] References Cited

U.S. PATENT DOCUMENTS

| | | | |
|---|---|---|---|
| 1,614,274 | 1/1927 | Briegel | 74/18.1 |
| 1,818,973 | 8/1931 | DeGiers | 74/18.1 |
| 2,211,403 | 8/1940 | Boldt et al. | 74/18.1 |
| 2,226,388 | 12/1940 | Richter | 74/18.1 |
| 2,362,456 | 11/1944 | Alden | 280/96.1 |
| 2,510,362 | 6/1950 | Anderson | 74/18.1 |
| 3,260,071 | 7/1966 | Westercamp | 74/18.1 |
| 3,349,805 | 10/1967 | Fried | 285/177 |
| 3,431,811 | 3/1969 | Yonkers | 74/18.1 |
| 3,638,503 | 2/1972 | Stipanovic et al. | 74/18 |
| 3,707,852 | 1/1973 | Burckhardt et al. | 64/32 F |
| 3,866,950 | 2/1975 | Skoch et al. | 285/4 |
| 4,229,010 | 10/1980 | St. Laurent, Jr. | 277/30 |
| 4,278,262 | 7/1981 | Mizutani et al. | 277/212 FB |
| 4,407,517 | 10/1983 | Neyer | 277/212 FB |

FOREIGN PATENT DOCUMENTS

| | | | |
|---|---|---|---|
| 241220 | 12/1960 | Australia | 464/175 |
| 93937 | 11/1983 | European Pat. Off. . | |
| 550651 | 9/1956 | Fed. Rep. of Germany | 277/212 FB |
| 1245236 | 7/1967 | Fed. Rep. of Germany | 277/212 FB |
| 2902455 | 7/1980 | Fed. Rep. of Germany . | |
| 1342949 | 10/1963 | France | 277/212 FB |
| 787767 | 12/1957 | United Kingdom | 464/173 |
| 1587400 | 4/1981 | United Kingdom . | |

Primary Examiner—Leslie A. Braun
Assistant Examiner—Scott Anchell
Attorney, Agent, or Firm—Pearson & Pearson

[57] ABSTRACT

A protective gaiter particularly for a motor vehicle steering joint is formed from a flexible tubular body. In a first embodiment, instead of relying on moulded convolutions to permit flexing in use, the tubular body is folded back over itself to form a U-bend or S-bend. This permits construction of the body with a seam along its length which can be closed during fitting so that the gaiter can be fitted without dismantling the joint. In a further embodiment which may be combined with the first embodiment, the gaiter has fitting sections of progressively increasing diameters at one or both ends so that the gaiter can be adapted to fit different sizes of joint members by selecting the appropriate fitting section and extending the gaiter body as required.

10 Claims, 4 Drawing Sheets

EXHIBIT "A"
PRIOR ART

PROTECTIVE GAITERS FOR JOINTS

This is a continuation of my application Ser. No. 210,654, filed June 23, 1988, now abandoned, which was a continuation of my original application Ser. No. 06/714,254, filed Mar. 21, 1985, now abandoned.

This invention relates to protective gaiters for joints particularly although not exclusively for use in motor vehicles.

Flexible rubber gaiters are used in motor cars to protect constant velocity joints and joints defined between steering racks and track rods so as to prevent ingress of dirt and moisture and egress of lubricants.

These gaiters customarily comprise one-piece moulded tubes having cylindrical end portions suitably diametered to fit the pertaining joint members and a convoluted central portion which can flex to allow bending and change of length. However, with this arrangement there is the problem that it is necessary to dismantle the joint members when a gaiter becomes damaged and required replacement.

One object of the present invention is to provide an improved flexible gaiter which it is feasible to construct such as to permit installation around a joint without requiring dismantling thereof.

According to one aspect of the invention therefore there is provided a flexible gaiter fitted around a joint defined between first and second joint members, said gaiter comprising a flexible tubular body having opposite ends secured respectively to said members, characterised in that at least one tubular portion of said body is turned within an adjacent tubular portion of the body.

With the arrangement of the invention, movement about the joint can be accommodated by flexing of the tube at the fold between the said portions. Accordingly, convolutions need not be moulded in the tubular body whereby it can be feasible to construct the tube in situ from a shaped sheet, in the form of a tubular body with a slit along its length, which can be wrapped around the joint and interconnected along adjacent edges. In this way, it will be appreciated that the gaiter can be installed without requiring dismantling of the joint.

With regard to the fold between the said portions, this may comprise a U-shaped fold defined by inturning of an end tubular portion within the adjacent tubular portion. Alternatively or additionally an S-shaped fold may be defined by turning an intermediate tubular portion within the adjacent tubular portion.

In accordance with a second aspect of the present invention there is provided a method of installing a gaiter around a joint defined between first and second joint members wherein a flexible shaped sheet in the form of a tubular body having a slit along its length is wrapped around the first joint member, opposite edges of said sheet defining said slit are secured together, and the body is turned to define at least one fold between tubular portions thereof, the opposite ends of the body being fixed respectively to the two joint members.

The arrangement may be such that the body is fixed at the pertaining end thereof to the first joint member prior to formation of the said fold, a U-shaped fold is then formed by turning the body back over said end fixed to the joint member, and the opposite end of the body is then fixed to the second joint member. Alternatively or additionally the arrangement may be such that the body is fixed at the pertaining end thereof to the first joint member prior to formation of the said fold, an S-shaped fold is then formed by turning the body backwards and forwards intermediate the ends thereof, and the opposite end of the body is then fixed to the second joint member.

Most preferably the said slit edges have cooperable configurations therealong which press fit or otherwise interlock to facilitate closure of the slit. Alternatively or additionally, preferably additionally, the slit edges are bonded together particularly with a sealing cement.

The shaped sheet may be pre-dimensioned at at least one end to suit a particular joint member diameter. Preferably however the said shaped sheet is tapered towards one or both ends thereof or has stepped fitting sections to facilitate attachment to joint members of different diameters. Tapering of the shaped sheet towards the said one end is also desirable in so far as it facilitates the aforementioned turning-back procedure.

According to a third aspect of the present invention there is provided a gaiter-forming structure comprising a flexible shaped sheet in the form of a tubular body having a slit along its length, opposite edges of said slit having cooperable configurations therealong which can interlock with each other to close the slit, said shaped sheet preferably being tapered towards at least one end thereof.

With regard to the requirement for fitting different diameters of joint members as mentioned above, constant velocity joints of different motor car models usually have different dimensions (different diameters and/or axial spacings of the joint members) and hitherto to allow for this it has been found necessary to provide a corresponding range of differently dimensioned gaiters. This is however not wholly satisfactory having regard to the manufacturing costs and also due to the inconvenience of maintaining stocks of the different gaiters.

A further object of the present invention is to provide a gaiter, preferably although not necessarily of the kind described in the first aspect of the present invention, which can be readily adapted to fit a range of differently dimensioned joints.

According to a fourth aspect of the invention therefore there is provided a protective gaiter for a joint comprising a tubular body having opposite end portions adapted to fit around and in sealing engagement with respective joint members and a flexible central portion, characterised in that at least one said end portion has a plurality of axially spaced annular fitting sections of progressively increased diameters, and said body is axially extensible.

With this arrangement the gaiter can be readily adapted to fit different joints having joint members of different diameters by selection of the appropriate fitting section for sealing engagement with the pertaining joint member. Fitting sections not selected may be cut away as desired and as appropriate before or after fitting on the joint. Moreover, the extensible body permits adjustment of the length of the gaiter to accommodate differences in joint lengths and to enable a desired length to be attained irrespective of which fitting section is selected.

Preferably said gaiter is axially extensible at said central portion thereof. Preferably also said central portion is folded over itself so as to permit axial extension and contraction of the tubular body.

Each end portion may have a respective plurality of axially spaced annular fitting sections of progressively increased diameters, and the tubular body may be generally conically tapered whereby at the wider end the diameters of the fitting sections increase away from the central portion and at the narrower end the diameters of the fitting sections increase towards the central portion.

In one embodiment the fitting sections are defined by stepped conformations, the inner surface of each section preferably being at least generally parallel to the gaiter axis.

Each fitting section may be appropriately configured on its inner surface for cooperation with a sealing configuration on the pertaining joint member. Thus each fitting section may have one or more circumferential ribs for cooperation with a sealing groove or grooves. In a particularly preferred embodiment, each fitting section has a plurality of triangular ribs arranged so that one such rib can be selected for engagement with a single sealing groove. Each fitting section may be appropriately configured on its outer surface as for example by provision of a channel or groove or the like thereon to receive a fixing device such as a circlip or the like.

With regard to the central portion this may have a double fold of S shape.

The gaiter may be moulded in one piece from any suitable natural or synthetic rubber material.

It is to be understood that the gaiter of the fourth aspect of the present invention may have all of the features of the gaiter of the first aspect as appropriate.

It is visualised that invention will find particular (although not exclusive) application in the context of the replacement of existing gaiters in steering rack and constant velocity joints of motor vehicles.

The invention will now be described further by way of example only and with reference to the accompanying drawings in which.

Figure 1:
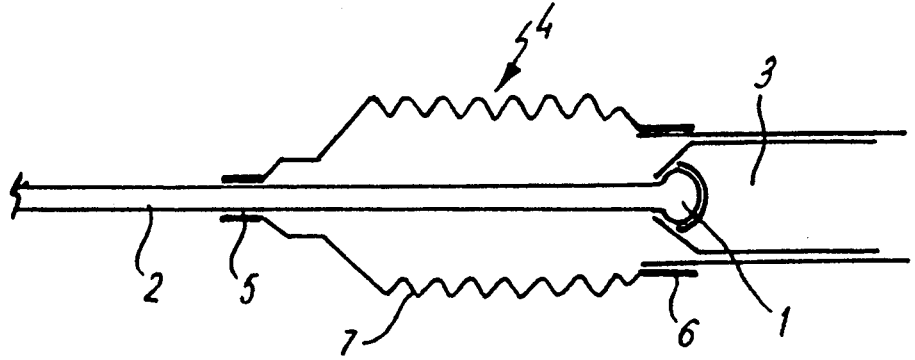
FIG. 1 is a diagrammatic sectional view of a motor car steering rack joint fitted with a conventional gaiter.

FIG. 1 shows a conventional joint 1 defined between a track rod 2 and a steering rack 3. FIG. 1 also shows a conventional gaiter 4 fitted around the joint 1, such gaiter 4 comprising a flexible rubber tube having a narrow cylindrical end 5 which is clipped tightly around the track rod 2, a wide cylindrical end 6 which is clipped tightly around the steering rack 3, and a convoluted central portion 7. The gaiter 4 is filled with lubricant and can flex at the convolutions to permit bending and longitudinal movement.

Figure 2:
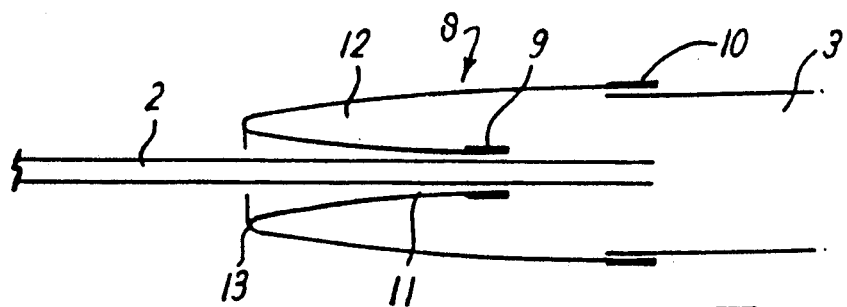
FIG. 2 is a view similar to FIG. 1 showing a gaiter in accordance with one form of the present invention.

The gaiter 8 shown in FIG. 2 comprises a flexible rubber tube having a narrow end 9 which is clipped tightly around the track rod 2 and a wide end 10 which is clipped tightly around the rack 3. The end portion 11 of the tube 8 adjacent the narrow end 9 is inturned within the adjacent central body portion 12 of the tube 8 thereby defining a fold 13 between such portions 11, 12. This gaiter 8 can be filled with lubricant in conventional manner and can accommodate bending and longitudinal movement by flexing about the fold 13 and by movement of the portion 11 inwardly and outwardly of the portion 12.

Figure 3:
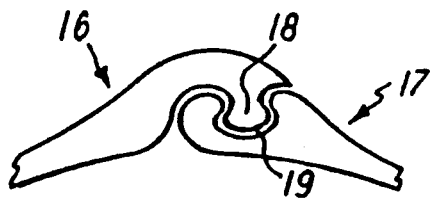
FIG. 3 is a sectional view to a larger scale of part of the fitted gaiter of FIG. 2.
Figure 4:
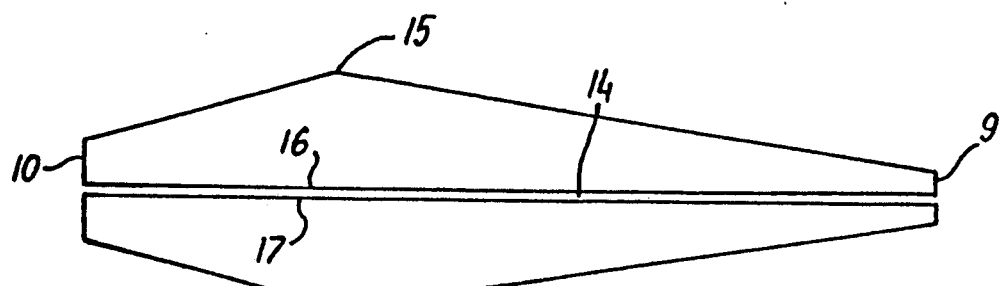
FIG. 4 is a plan view of a structure utilised in forming the gaiter of FIGS. 2 and 3.

The gaiter 8 is formed from a one-piece moulded sheet as shown in FIG. 4 in the form of a tubular body generally of circular cross-section throughout having a slit 14 along its entire length. The shaped sheet is tapered over a major part of its length from a position 15 of maximum diameter to the said narrow end 9 and is tapered from said position 15 to the opposite said wider end 10. The edges 16, 17 of the sheet bounding the slit are provided with configurations 18, 19, as shown in FIG. 3, which can press fit into interlocking engagement with each other.

The gaiter 8 is installed around the joint 1 in the following manner.

With the slit 14 open the narrow end 9 is wrapped around the track rod 2 with the other end 10 facing away from the rack 3 and the narrow end 9 is held in position with the usual clip (not shown). The slit 14 is closed by pressing the configurations 18, 19 into engagement with each other and a rubber cement is applied to the configurations to fix and seal same. The cement has suitable elastically and mechanical properties as well as resistance to oils, greases and ageing. The cement is applied with a bonding agent or solution which gives a setting time of about 10 minutes to give ample time to locate the interlocking configurations.

The configurations are located so that they do not interfere with secure attachment of the gaiter to the track rod 2 and rack 3.

After setting of the cement, the tubular body is folded over to bring the wider end 10 onto the rack 3. The wider end 10 is then fixed in position with the usual clip (not shown) after first inserting lubricant into the gaiter in the usual manner.

In this way it will be seen that a satisfactory gaiter can be installed without requiring any dismantling of the joint.

Lengths of one or both of the tapered end portions of the shaped sheet may be cut off prior to fitting to give a desired end diameter adapted to the diameter of the pertaining joint member 2 or 3.

Figure 5:
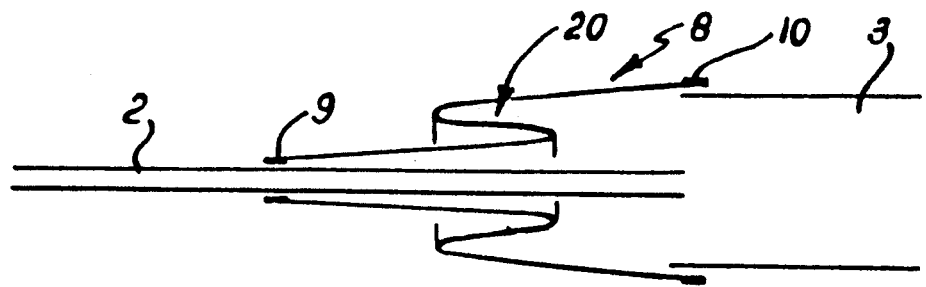
FIGS. 5 and 6 are views similar to FIG. 2 of alternative embodiments.
Figure 6:
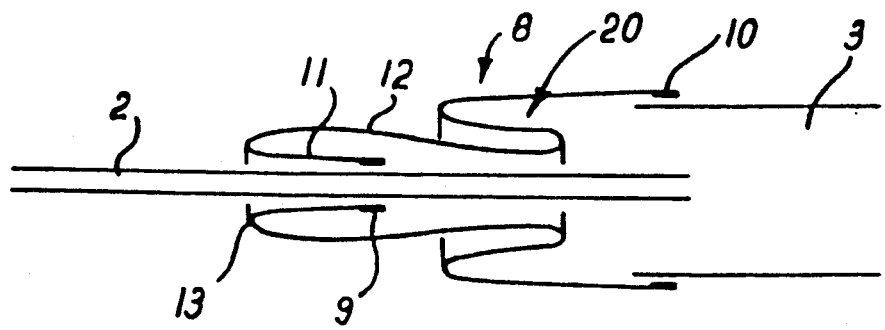
Figure 7:
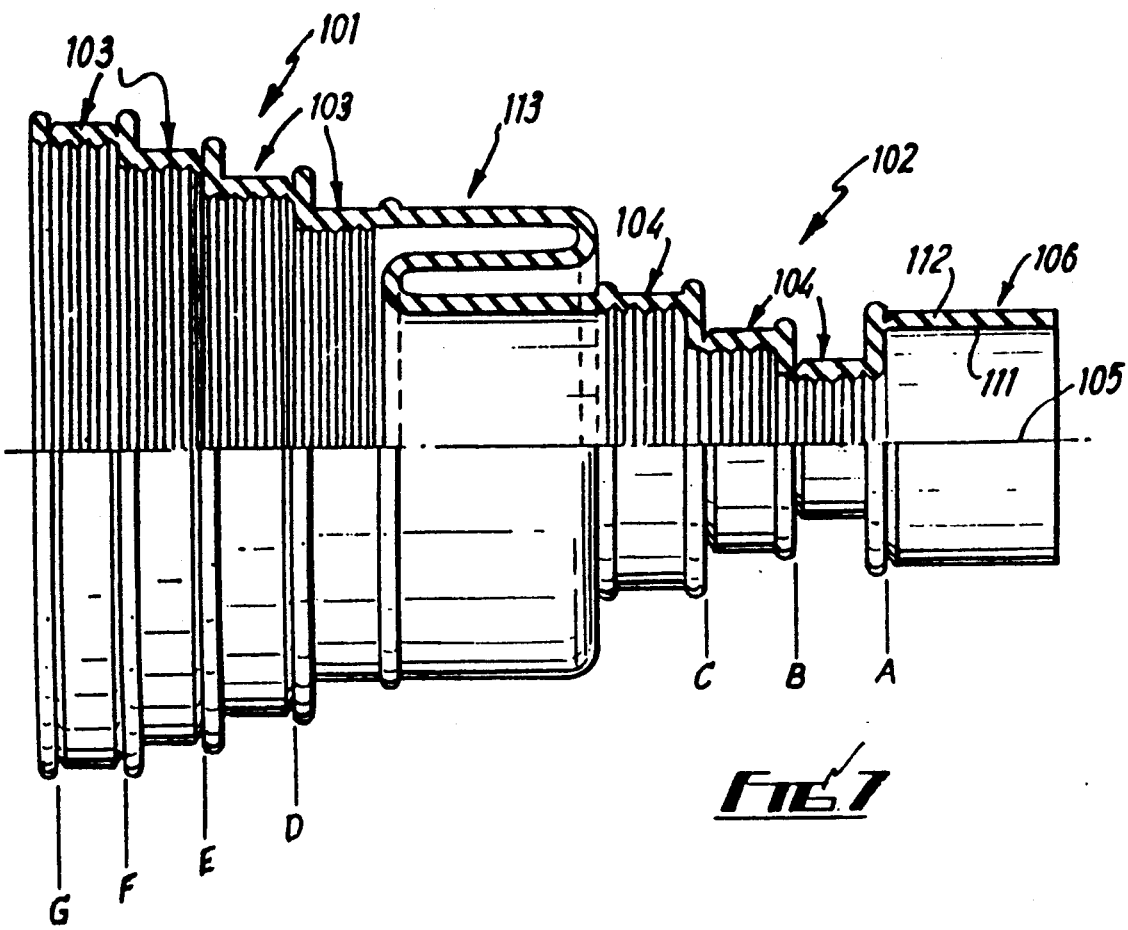
FIG. 7 is an axial sectional view of a further form of a gaiter according to the invention.

The embodiments of FIGS. 5 and 6 are identical with the embodiment of FIGS. 2 to 4 (and like reference numerals are used for like parts) except that the tubular body 8 is folded backwards and forwards during fitting to give an S-shaped fold 20. This fold 20 may be instead of the fold 13 (FIG. 5) or in addition thereto. This fold 20 provides general flexibility and also permits longitudinal adjustment to accommodate joints having different longitudinal dimensions. Reference is made to FIG. 7 described hereinafter and which shows a suitable S-shaped fold in greater detail.

Although it is preferred that the gaiter should be formed from a shaped sheet having a flat or generally flat outer surface as shown in FIG. 4, it may be possible to use with the interlock of FIG. 3 a pre-moulded convoluted configuration which may be like the conventional structure shown in FIG. 1 or which may be of a less pronounced nature (comprising for example shallow waves) or a pre-moulded S-shaped fold of the kind shown in FIGS. 5 and 6. Indeed, it may be possible to rely wholly on pre-moulded convolutions for flexibility instead of forming a fold in situ.

Figure 8:
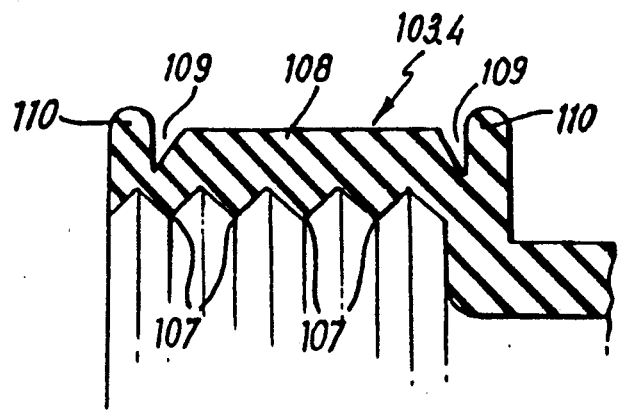
FIG. 8 is a view to a larger scale of a detail of the gaiter of FIG. 7.

The gaiter of FIGS. 7 and 8 comprises a one-piece moulded rubber tube generally of frusto-conical form.

The end portions 101, 102 of the tube are each stepped to define a number of annular fitting sections 103, 104 of progressively increasing diameter which extend parallel to the tube axis 105. At the wider end of the tube there are four such sections 103 increasing in diameter towards the pertaining free end. At the narrower end there are three such sections 104 decreasing in diameter towards the pertaining free end. At the extremity of the narrower end there is a cylindrical section 106 of larger diameter than the smallest fitting section 104.

As better shown in FIG. 8 each section 103, 104 is provided with circumferential triangular section ribs 107 on its inner surface which are coaxial with the tube axis 105. On its outer surface each section 103, 104 has a flat central annular surface 108 bounded by grooves 109 and upstanding ribs 110. The end cylindrical section 106 has flat surfaces 111, 112 both internally and externally.

The central portion 113 of the gaiter comprises a flat-surfaced tubular portion which is folded over itself to define an S-shaped bend.

In use the gaiter is fitted around a joint (such as a motor car constant velocity joint) and is secured in position (after filling with a suitable lubricant) by clamping one of the sections 103 at the wider end around one joint member and one of the sections 104 or 106 at the narrower end around the other joint member.

Sections 103, 104, 106 which are outwardly of the sections which are clamped in position may be cut away at respective ones of the positions identified by letters A-G on the drawing.

The sections 103, 104 and 106 are clamped in position by circlips or the like around the outer surfaces 108, 112 of the sections. In accordance with usual practice each joint member may have a circumferential sealing groove and the sections 103, 104 deform on clamping to force one of the ribs 107 into the groove. In this respect the triangular shape of the ribs 107 facilitates sealing engagement even if the groove is of part-circular or square or other section.

The length of the gaiter is adjusted as required by extension or contraction of the gaiter at the folded central portion 113. In this respect the gaiter may be manufactured with the S-bend preformed and so as to be capable of deformation as required. Alternatively, the gaiter may be manufactured with a straight (frusto-conical) central portion which is folded to form the S bend to an appropriate extend during or prior to fitting.

With this arrangement, it will be appreciated that the gaiter can be readily adapted to fit a range of joints. The need to manufacture and stock a wide range of gaiters to fit different joints can therefore be avoided or at least minimised.

Figure 9:
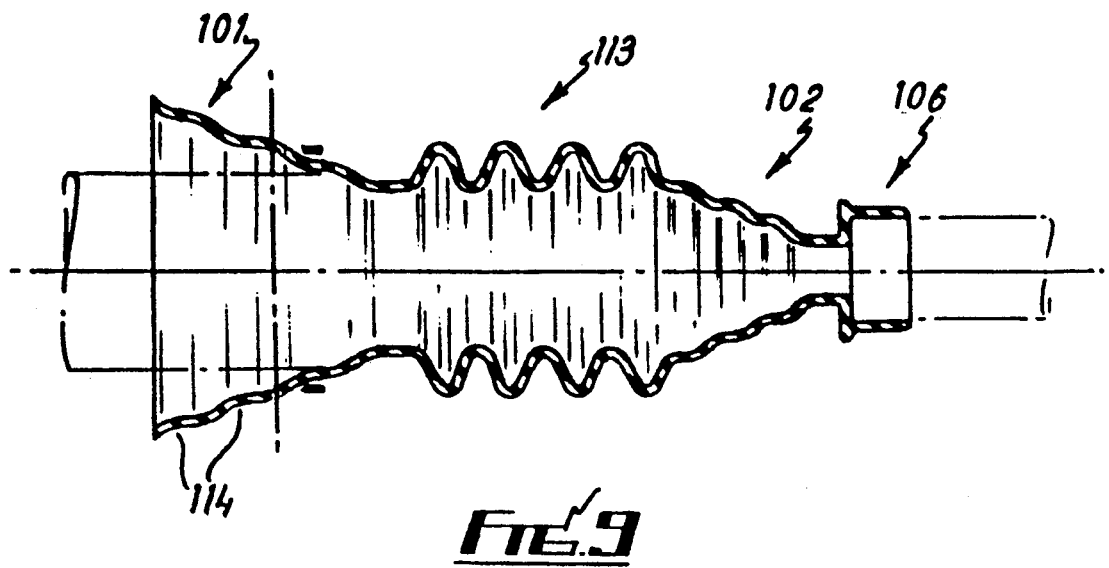
FIGS. 9 and 10 are views similar to FIG. 7 of alternative embodiments.

As shown in FIG. 9 (in which like numerals are used for corresponding parts to FIG. 7) as an alternative to the use of the S bend in the central portion 113 it is possible to use convolutions if these are of adequate flexibility and extensibility. Moreover instead of the stepped sections 103 it is possible to use circumferential grooves 114 of wavy profile.

Figure 10:
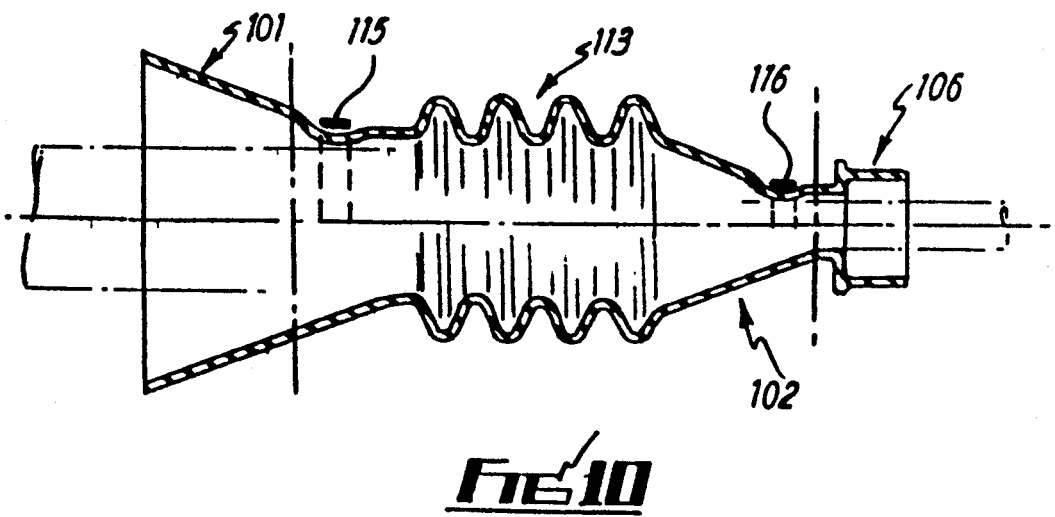

As shown in FIG. 10 it is even possible to use straight-sided frusto-conical end portions 101, 102 if these are of sufficient flexibility to be clamped, as shown, into sealing engagement with the joint members by the circlips or ties 115, 116 used.

It is of course to be understood that the invention is not intended to be restricted to the details of the above embodiments which are described by way of example only.

What is claimed is:

1. A protective gaiter to fit around a lubricated joint between members, said gaiter comprising a one-piece tubular body having first and second ends with inner and outer surfaces thereto and a flexible central portion between said ends, both said ends having annular fitting sections around their outer surfaces to receive fixing devices whereby the said inner surfaces can be clamped into sealing engagement respectively with said joint members thereby to seal said lubricated joint, only said portion being folded whereby the said tubular body is generally frusto-conical and axially extensible, said first and second ends being deformably flexible and of stepped configuration, such that the steps are capable of collapsing upon one another in a concertina like manner, said first end having a plurality of axially spaced said annular fitting sections of internal diameters which are progressively increased away from said central portion, and said second end having a plurality of axially spaced said annular fitting sections of internal diameters which are progressively decreased away from said central portion, each said fitting section being deformable whereby the inner surfaces of both said ends can be clamped into sealing engagement with joint members of different diameters corresponding to the different said internal diameters.

2. A gaiter according to claim 1, wherein each said fitting section has a plurality of triangular ribs on the inner surface for cooperation with a sealing groove or grooves on the pertaining joint member, and an upstanding rib proximate a groove at an axial end of each of said annular fitting sections.

3. A gaiter according to claim 1, wherein the central portion has a double fold of S-shape.

4. A protective gaiter to fit around a lubricated joint between members, said gaiter comprising a one-piece tubular body having first and second ends with inner and outer surfaces thereto and a flexible central portion between said ends, both said ends having annular fitting sections around their outer surfaces to receiving fixing devices whereby the said inner surfaces can be clamped into sealing engagement respectively with said joint members thereby to seal said lubricated joint, said portion being folded whereby the said tubular body is generally frusto-conical and axially extensible, said first and second ends being deformably flexible and of stepped configuration, said first end having a plurality of axially spaced said annular fitting sections of internal diameters which are progressively increased away from said central portion, and said second end having a plurality of axially spaced said annular fitting sections of internal diameters which are progressively decreased away from said central portion, each said fitting section being deformable whereby the inner surfaces of both said ends can be clamped into sealing engagement with joint members of different diameters corresponding to the different said internal diameters, and a plurality of triangular ribs being provided on the inner surface of each fitting section.

5. A gaiter according to claim 4 wherein upstanding ribs are provided at the ends of the fitting sections.

6. A method of installing a protective gaiter around a lubricated joint defined between first and second joint members using a flexible shaped sheet in the form of a tubular conical body with first and second ends and a central portion between said ends and having a slit along its length, wherein said sheet is wrapped around the first joint member, opposite edges of said sheet defining said slit are secured together, and the body is turned over on top of itself to define at least one flexible axially extensible fold in said central portion, said fold being adjusted to select a desired axial separation for the said first and second ends, the said first and second ends of the body being fixed respectively to the first and second joint members at axially spaced positions.

7. A method according to claim 6, wherein the first end of the body is fixed to the first joint member prior to the formation of said fold, a U-shaped fold is then formed by turning the body back over said first end and the second end of the body is then fixed to the second joint member.

8. A method according to claim 6, wherein the body is fixed at the first end thereof to the first joint member prior to the formation of the said fold, an S-shaped fold is then formed by turning the body backwards and forwards intermediate the ends thereof, and the second end of the body is then fixed to the second joint member.

9. A method according to claim 6, wherein the slit edges are secured together by interlocking of cooperable configurations therealong.

10. A method of installing a protective gaiter around a lubricated joint defined between first and second joint members using a flexible shaped sheet in the form of a tubular body with first and second ends and a central portion between said ends having a slit along its length, wherein the shaped sheet is tapered towards said first and second ends thereof and is cut as necessary before fitting to give a desired diameter at such end, said sheet is wrapped around the first joint member, opposite edges of said sheet defining said slit are secured together, and the body is turned over on top of itself to define at least one flexible axially extensible fold in said central portion, said fold being adjusted to select a desired axial separation for the said first and second ends, the said first and second ends of the body being fixed respectively to the first and second joint members at axially spaced positions.

* * * * *